(12) United States Patent
Chang (10) Patent No.: US 11,398,057 B2
(45) Date of Patent: Jul. 26, 2022

(54) IMAGING SYSTEM AND DETECTION METHOD

(71) Applicant: INSTITUTE FOR INFORMATION INDUSTRY, Taipei (TW)

(72) Inventor: Jun-Dong Chang, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 113 days.

(21) Appl. No.: 16/776,491

(22) Filed: Jan. 29, 2020

(65) Prior Publication Data

US 2021/0166429 A1    Jun. 3, 2021

(30) Foreign Application Priority Data

Nov. 28, 2019 (TW) .................................. 108143482

(51) Int. Cl.
*G06T 7/00* (2017.01)
*G06T 7/33* (2017.01)
(Continued)

(52) U.S. Cl.
CPC ............... *G06T 7/97* (2017.01); *G06N 3/08* (2013.01); *G06T 7/337* (2017.01); *G06V 10/255* (2022.01)

(58) Field of Classification Search
CPC .... G06T 7/97; G06T 7/90; G06T 7/66; G06T 2207/20081; G06T 2207/20084;
(Continued)

(56) References Cited

U.S. PATENT DOCUMENTS 11,010,894 B1 * 5/2021 Shenk .................. G06K 9/6218
2018/0233130 A1 * 8/2018 Kaskari .................. G10L 15/16
(Continued)

FOREIGN PATENT DOCUMENTS

TW        201818349 A    5/2018
TW        201913040 A    4/2019

OTHER PUBLICATIONS

The office action of the corresponding Taiwanese application dated Jan. 22, 2021.

*Primary Examiner* — Claire X Wang
*Assistant Examiner* — Stephen M Brinich
(74) *Attorney, Agent, or Firm* — CKC & Partners Co., LLC (57) ABSTRACT

The present disclosure relates to an imaging system and a detection method. The detection method includes the following steps. Receiving, by a processing unit of the image system, multiple recognition label data sets transmitted from multiple terminal devices. Determining a matching degree value between the recognition label data sets and an image data, and obtaining multiple weight values from a storage unit corresponding to the terminal devices. Setting the weight values and the corresponding matching degree values as multiple label points, and classifying the marker points into multiple cluster groups by a clustering algorithm. Calculating a centroid of the largest cluster group. The centroid of the largest cluster group corresponds to a clustering weight value and a clustering matching value. When the clustering weight value or the clustering matching value meets an adjustment condition, adjusting a neural network unit according to the largest cluster group.

12 Claims, 9 Drawing Sheets

(51) Int. Cl.
*G06N 3/08* (2006.01)
*G06V 10/20* (2022.01)

(58) Field of Classification Search
CPC .. G06K 9/3241; G06K 9/3233; G06K 7/1482; G06N 3/02; G06V 10/82; G06V 10/70; G06V 10/95; G06V 2201/08
USPC ................. 382/155–160, 180, 218–219, 100
See application file for complete search history.

(56) References Cited

U.S. PATENT DOCUMENTS

| | | | |
|---|---|---|---|
| 2018/0253648 A1* | 9/2018 | Kaskari | G06N 3/084 |
| 2019/0294758 A1* | 9/2019 | Prozuments | G16C 20/70 |
| 2020/0027002 A1* | 1/2020 | Hickson | G06K 9/6218 |
| 2020/0302225 A1* | 9/2020 | Dutta | G06K 9/036 |

* cited by examiner

IMAGING SYSTEM AND DETECTION METHOD

CROSS-REFERENCE TO RELATED APPLICATION

This application claims priority to Taiwan Application Serial Number 108143482, filed Nov. 28, 2019, which is herein incorporated by reference in its entirety.

BACKGROUND

Technical Field

The present disclosure relates to an image system and a detection method, especially the technology for receiving and label images.

Description of Related Art

Technology is gradually changing people's lives. Taking image recognition technology as an example, through the combination of artificial intelligence, machine learning and network technology, the computer can automatically perform accurate judgments and actions, and the image recognition technology is widely used at various levels, such as road traffic, medical care, and industrial production.

However, image recognition technology requires a large amount of data to perform machine learning on computers and construct learning models. In addition, the data used for machine learning must be labeled and stored in categories. "Label" is to mark a specific object in the image. For example, circle the corresponding range of "car" in an image. The correctness of the label will directly affect the effect of computer machine learning.

SUMMARY

One aspect of the present disclosure is a detection method, comprising the following steps. Receives a plurality of recognition label data sets transmitted from a plurality of terminal devices by a processing unit of an image system. The plurality of recognition label data sets correspond to an image data in a storage unit. Determining a plurality of matching degree values between the plurality of recognition label data sets and the image data. The plurality of matching degree values correspond to the plurality of terminal devices. Obtaining a plurality of weight values from the storage unit corresponding to the plurality of terminal devices. Setting the plurality of weight values and the corresponding matching degree values as a plurality of label points, and classifying the plurality of label points into a plurality of cluster groups by a clustering algorithm. Calculating a centroid of a largest cluster group of the plurality of cluster groups, and the centroid corresponds to a clustering weight value and a clustering matching value. When the clustering weight value or the clustering matching value meets an adjustment condition, adjusting a neural network unit according to the largest cluster group.

Another aspect of the present disclosure is an image system. The image system comprises a neural network unit, a storage unit and a processing unit. The storage unit is configured to store an image data and a plurality of weight values. The plurality of weight values correspond to a plurality of terminal devices connected to the imaging system. The processing unit is connected to the neural network unit and the storage unit. The processing unit is configured to determine a plurality of matching degree values between the plurality of recognition label data sets and the image data according to a plurality of recognition label data sets transmitted from the plurality of terminal devices. The processing unit is further configured to set the plurality of weight values and the corresponding matching degree values as a plurality of label points, and is configured to classify the plurality of label points into a plurality of cluster groups by a clustering algorithm. The processing unit is further configured to calculate a centroid according to a largest cluster group of the plurality of cluster groups, and when the centroid meets an adjustment condition, the processing unit is configured to adjust the neural network unit according to the largest cluster group.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1A:
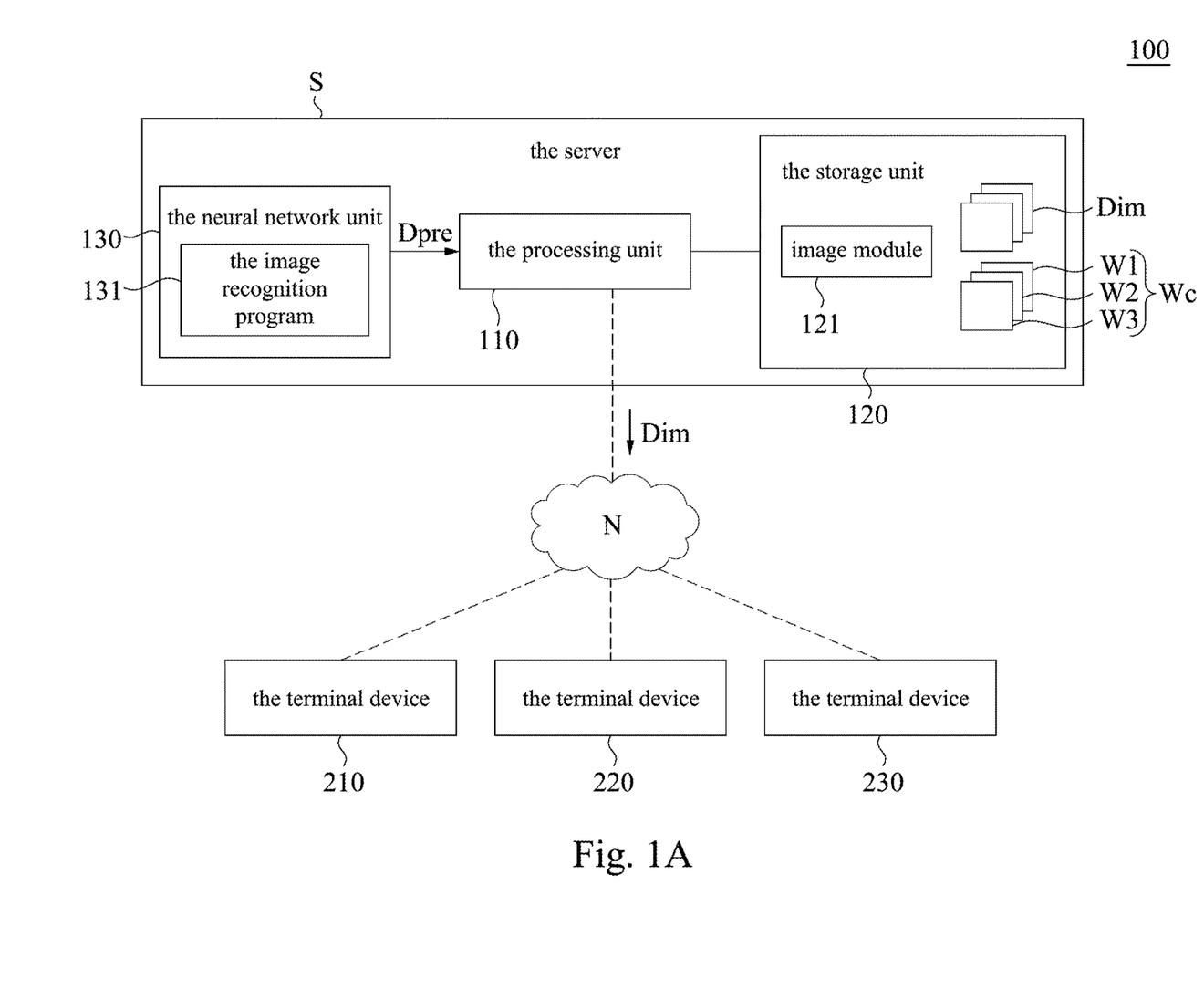
FIG. 1A and FIG. 1B are schematic diagrams of an image system in some embodiments of the present disclosure.
Figure 1B:
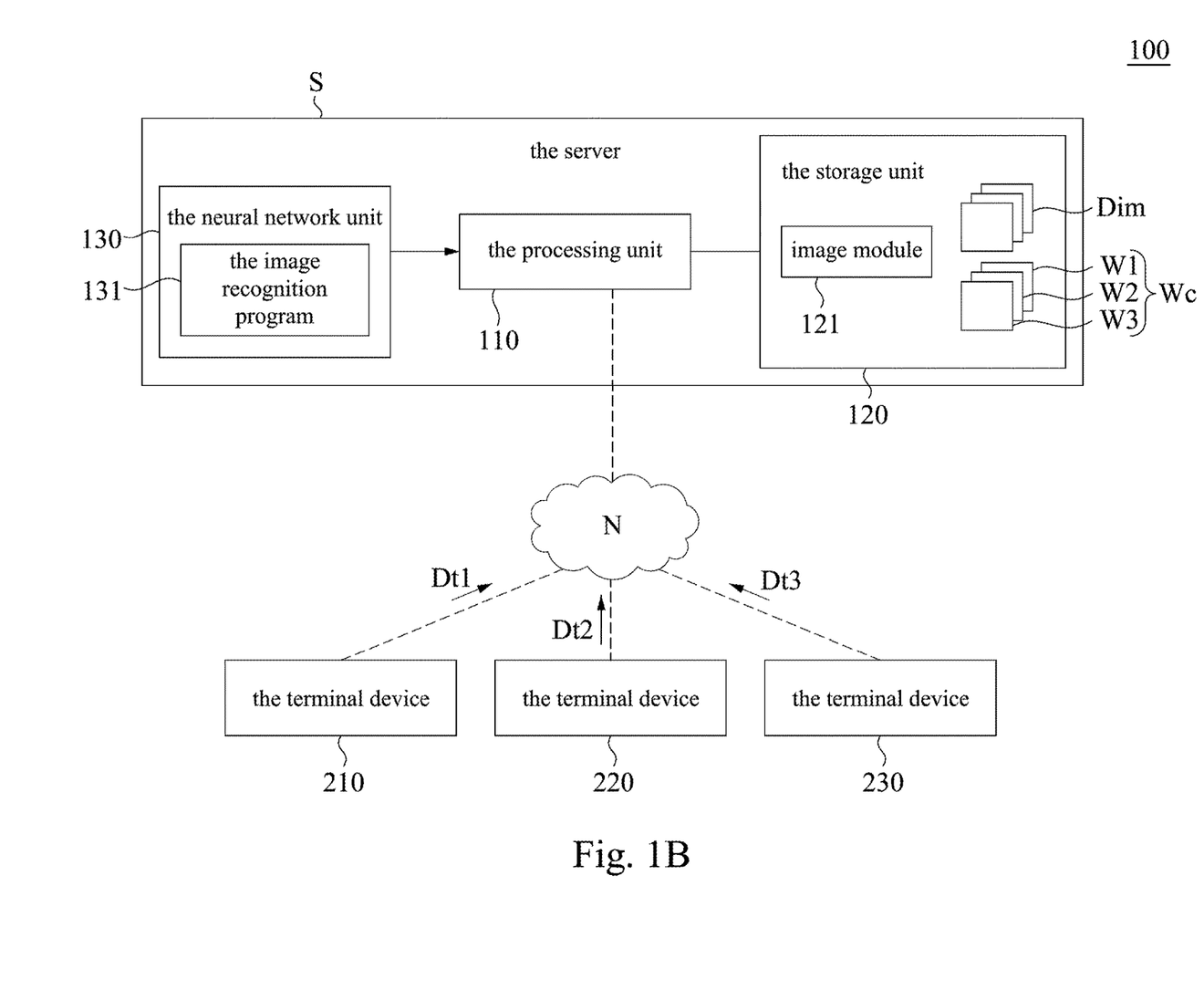

Referring to FIG. 1A and FIG. 1B, FIG. 1A and FIG. 1B are schematic diagrams of an image system in some embodiments of the present disclosure. The imaging system 100 includes a processing unit 110, a storage unit 120, and a neural network unit 130. In some embodiments, the processing unit 110, the storage unit 120, and the neural network unit 130 are arranged in the same server S, and are used to provide cloud services for image recognition, image label, and model creation. The user uploads at least one image to the server S through terminal devices 210-230, and recognizes and labels each object in the image through a image recognition program 131 provided by the server S. For example, the server S uses the neural network unit 130 to recognize a photo of "urban road", and recognize the car, traffic lights, and other objects in the photo, and label and classify objects separately. (e.g., circle a car and classify it into "cars"). In other embodiments, the neural network unit 130 may also be arranged in other host computers connected to the processing unit 110.

The neural network unit 130 includes multiple sets of recognition files for comparison with pending images. For example, the recognize file includes images of cars at various angles or various lights, or includes many different types of car images, so that the neural network unit 130 may determine whether there is an object corresponding to the "car" classification in the pending image through comparison. In some embodiments, the neural network unit 130 is a type of Convolutional Neural Networks for deep learning based on multiple sets of recognition files, but the neural network unit 130 is not limited to this type. Since those skilled in the art understand the basic structure and operating principles of neural networks, it is not repeated here.

Although the neural network unit 130 may analyze images uploaded by users, and may recognize and label various objects, regular machine learning is still required to update the database to ensure the accuracy of the recognition and label. One of the purposes of the present disclosure is to provide a detection method so that the imaging system 100 can determine whether the neural network unit 130 needs to be adjusted. The above "correction" refers to inputting new learning materials to the neural network unit 130. The learning materials include images and labels (such as regional coordinate values) of objects in the images, so that the neural network unit 130 updates its internal data files.

Referring to FIG. 1A, the storage unit 120 is configured to store at least one image data Dim and multiple weight values We (weight coefficients). In this embodiment, the storage unit 120 stores multiple the image data Dim. The storage unit 120 may include, but is not limited to, flash memory, hard disk drive (HDD), solid state drive (SSD), dynamic random access memory (DRAM), or static random access memory (SRAM). The weight values We respectively correspond to multiple terminal devices 210-230 connected to the server S. As shown in FIG. 1A, in this embodiment, the weight values We further includes the weight values W1-W3, and correspond to the terminal devices 210-230, respectively. The above "correspond to the terminal device 210-230" means that the weight values W1-W3 correspond to different users, and the processing unit 110 recognizes different terminal devices 210-230. For example, the users of the terminal device 210-230 connects to the server S with a specific account, so that the server S can recognize the user based on the specific account, and the specific account will correspond to the weight values Wc. The details and setting method of the weight values We will be explained in the following paragraphs.

Figure 2:
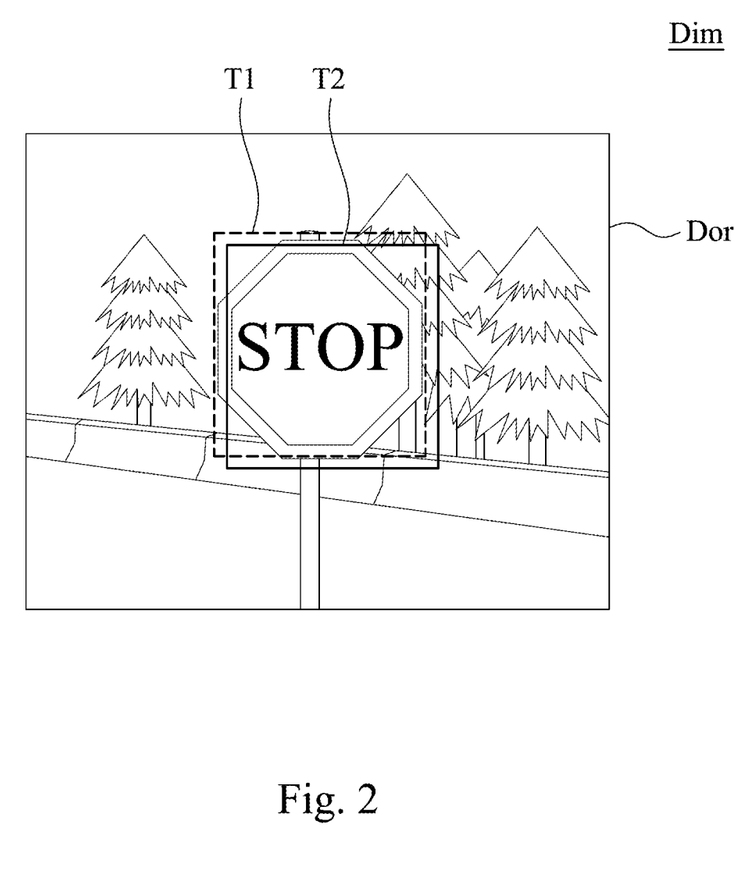
FIG. 2 is a schematic diagram of the image data in some embodiments of the present disclosure.

In order to facilitate the explanation of the operation of the present disclosure, the operation of the "label" is illustrated here graphically. Referring to FIG. 2, FIG. 2 is a schematic diagram of the image data in some embodiments of the present disclosure. The image data Dim includes an original image Dor that needs to be recognized and labeled. In FIG. 2, the edges of the label T1 correspond to the edges of the traffic sign, which belong to the edges of the correct (ideal) label. The edges of the label T2 is slightly biased. The definition of the "label" of the matching degree values (Intersection over Union, IoU) is defined as: The intersection area of the two images divided by the union area of the two images. Taking FIG. 2 as an example, if the label T1 is used as the "ideal label" and the label T2 is used as the "recognition label", then the matching degree values of the label T2 is "the intersection area of T1 and T2 divided by the union area of T1 and T2".

In some embodiments, the neural network unit 130 is configured to establish the image recognition program 131 (recognition module) through deep learning to recognize and label images uploaded by users. As mentioned above, in order for the image recognition program 131 to continuously improve its accuracy through machine learning, the imaging system 100 must determine whether the neural network unit 130 needs to correct according to the new learning materials. In this embodiment, the processing unit 110 is configured to perform this determination action.

The processing unit 110 may include, but is not limited to, a single processor and integration of multiple microprocessors, such as a Central Processing Unit (CPU) or a Graphic Processing Unit (GPU). As shown in FIG. 1B, the processing unit 110 is electrically or communicatively connected to the storage unit 120 and the neural network unit 130, and transmits the image data Dim of the storage unit 120 to the terminal devices 210-230 through the Internet N. In some embodiments, in addition to photos, the image data Dim also includes the forecast data sets Dpre. The forecast data sets Dpre is generated by the neural network unit 130 by automatically forecasting the images in the image data Dim.

Figure 3:
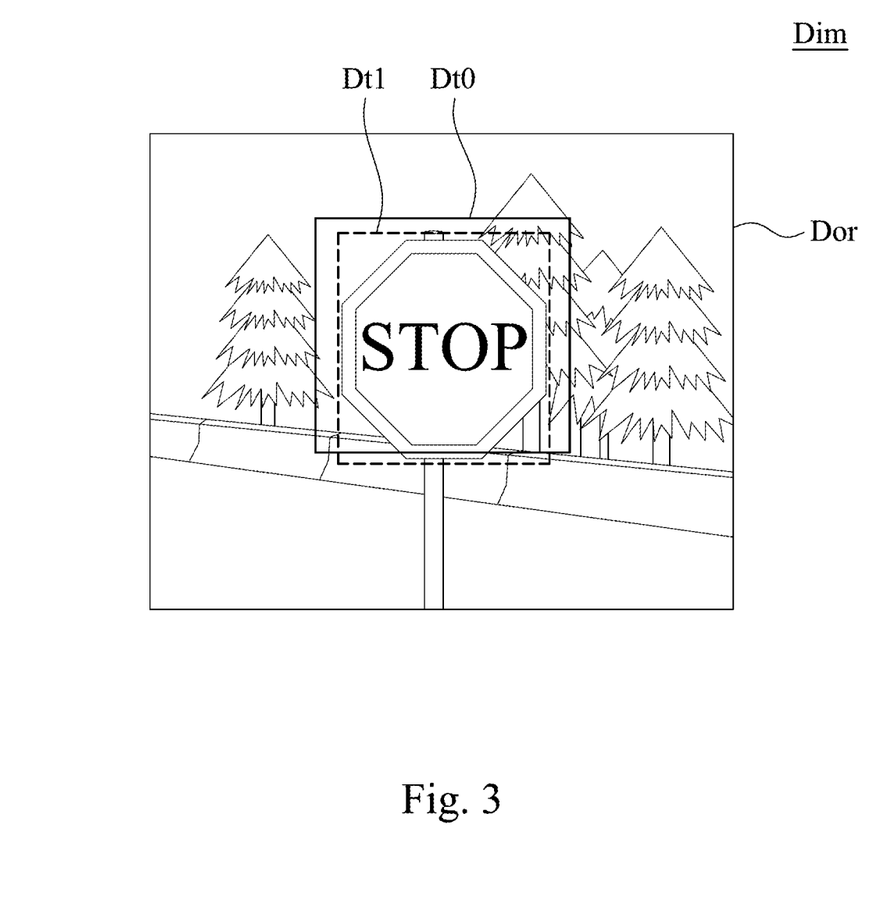
FIG. 3 is a schematic diagram of the recognition label in some embodiments of the present disclosure.

After the terminal devices 210-230 receive the image data Dim, the terminal devices 210-230 label the image data Dim to generate multiple the recognize identification label data sets (such as Dt1 and Dt2 in FIG. 1B). Referring to FIG. 3, for example, after user connects to the server S through the terminal device 210, the user browses the image data Dim through the server S. The user browses the original image Dor in the image data Dim and multiple forecast labels Dt0 in the forecast data sets Dpre (only one of forecast labels is shown in FIG. 3). The user may adjust the forecast label Dt0 in the original image Dor to ensure that the edges of the label corresponds to the object correctly to generate the recognition label data set Dt1 (e.g., adjust the area or position of the forecast label Dt0). FIG. 3 shows only one object of the image data Dim, but in some other embodiments, the image data Dim includes a large number of objects. The user will use the terminal device 210-230 to label multiple forecast labels. Alternatively stated, the recognition label data set Dt1 includes one or more label ranges.

In some embodiments, the recognize identification label data sets Dt1-Dt3 generated by the terminal devices 210-230 include a set of coordinate values or a region label to correspond to a region in the image data Dim. For example, the recognize identification label data set includes two diagonal coordinate values to correspond to a rectangular area in the image data Dim. For example, the recognize identification label data sets Dt1 includes two coordinate values "3, 6" and "10, 8". The coordinate values "3, 6" and "10, 8" may be regarded as the two diagonal ends of a rectangular area, and the rectangular area is the result of the terminal device 210 labeling the image data Dim.

the processing unit 110 is configured to receive the recognize identification label data sets Dt1 to Dt3, and is configured to determine the matching degree values between each of the recognize identification label data sets Dt1-Dt3 and the image data Dim according to the recognize identification label data sets Dt1-Dt3. "The matching degree values" represents the degree of correspondence between the recognize identification label data sets Dt1-Dt3 and the forecasted objects (i.e., the correctness of the label). The calculation of the matching degree values will be explained in detail in the following paragraphs.

After obtaining the matching degree values, the processing unit 110 sets the weight values W1-W3 corresponding to the same terminal devices 210-230 and the obtained matching degree values as the label points. For example, if the weight values corresponding to the terminal device 210 is "0.6", and the generated matching degree value between the identification label data set Dt1 and the image data Dim is "85%", the coordinate point of the label point corresponds to the coordinate value in horizontal axis is 0.6, and corresponds to the coordinate value in the vertical axis is "85".

As mentioned above, after setting multiple the label points, the label points are divided into multiple cluster groups by a clustering algorithm. The processing unit 110 calculates a centroid of a largest cluster group of the multiple cluster groups. If the centroid matches the adjustment condition preset in the server S, the processing unit 110 adjusts the neural network unit 130 according to the largest cluster group.

Figure 4A:
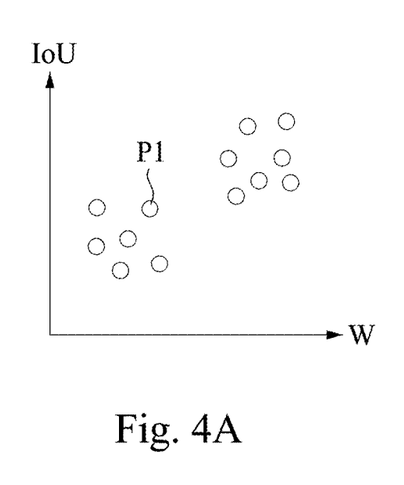
FIG. 4A-FIG. 4H are schematic diagrams of the calculation process of the clustering algorithm in some embodiments of the present disclosure.
Figure 4B:
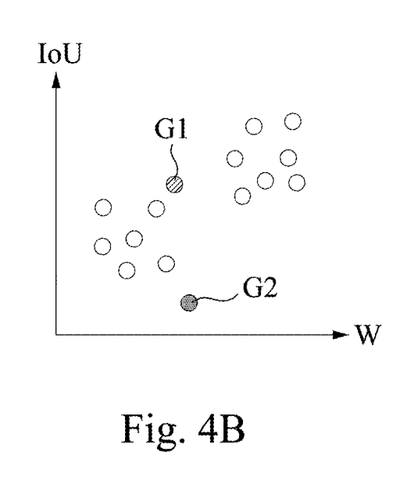

FIG. 4A-FIG. 4H are schematic diagrams of the calculation process of the clustering algorithm in some embodiments of the present disclosure. In FIG. 4A-FIG. 4H, the vertical axis of the coordinate is the matching degree value (IoU, between 0-100), and the horizontal axis is the weight values (between 0-1). After the processing unit 110 calculates the matching degree values corresponding to each of the terminal devices 210-230, the processing unit 110 sets the label points according to the weight values. As shown in FIG. 4A, each of the label points corresponds to one of the terminal devices 210-230. For example, the label point P1 corresponds to the terminal device 210, and corresponds to the matching degree values "50%" and the weight values "0.35", so the coordinate values of the label point P1 are "0.35, 50". Similarly, the label points P2 and P3 correspond to the terminal devices 220 to 230, respectively.

Figure 4C:
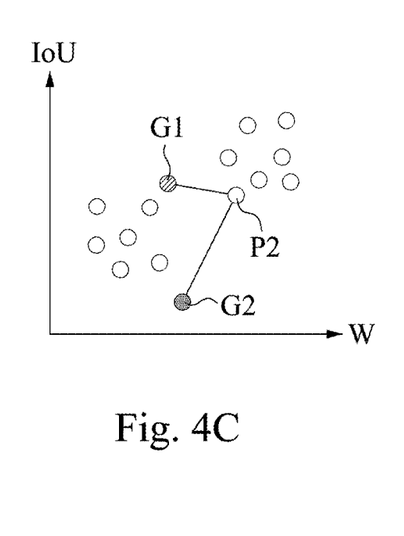

In some embodiments, the clustering algorithm is K-means clustering algorithm. When executing the clustering algorithm, the processing unit 110 may randomly select any number of initial cluster points, and the number of initial cluster points will depend on the number of final cluster groups. The number of the cluster groups may be determined by the processing unit 110. Taking FIG. 4B as an example, the processing unit 110 first randomly sets two initial clustering points G1 and G2. Next, the processing unit 110 calculates the distance from each the label point to the two initial clustering points G1 and G2, and classifies the label point to the closer initial clustering point. As shown in FIG. 4C, the distance between the label point P2 and the initial clustering point G1 is smaller than the distance between the label point P2 and the initial clustering point G2, so the label point P2 is classified corresponding to the initial clustering point G1.

Figure 4D:
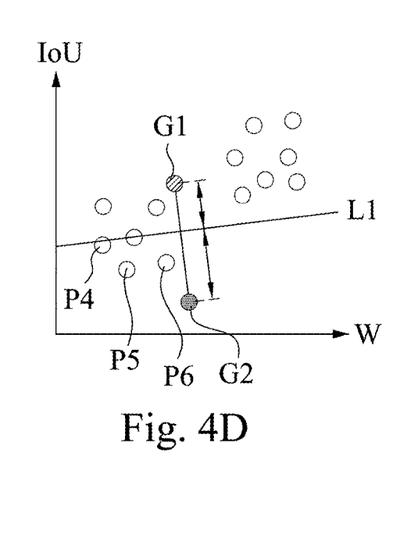
Figure 4E:
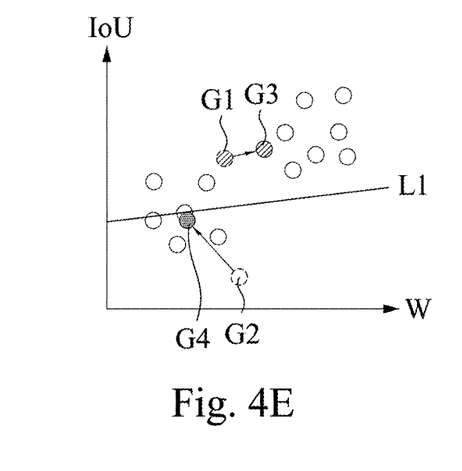

As shown in FIG. 4D, after calculating the distance between each the label point and the two initial cluster points G1 and G2, all of the label points correspond to one initial cluster point, respectively, to form two cluster groups (e.g., the label points P4-P6 correspond to the initial grouping point G2). The preliminary cluster groups may be separated by a first clustering line L1. Then, the processing unit 110 separately calculates the center of each cluster group, and updates the original initial cluster points G1 and G2 to the new cluster points G3 and G4 according to the center of each cluster group (as shown in FIG. 4E).

Figure 4F:
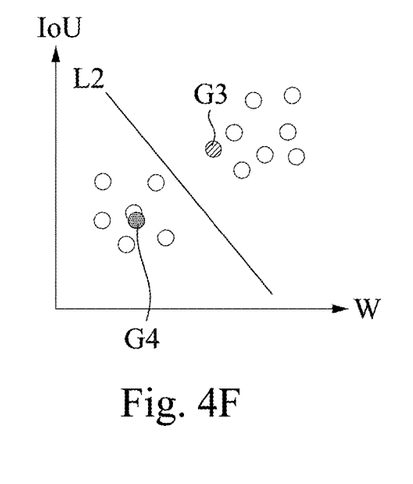
Figure 4G:
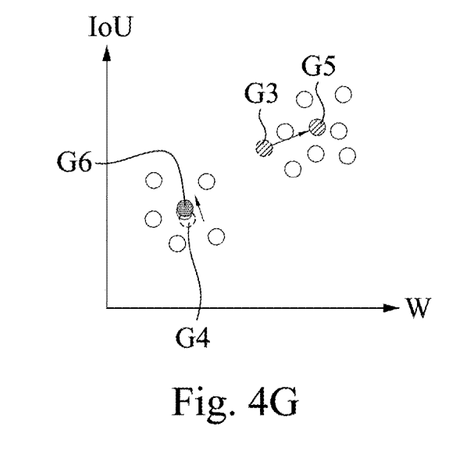
Figure 4H:
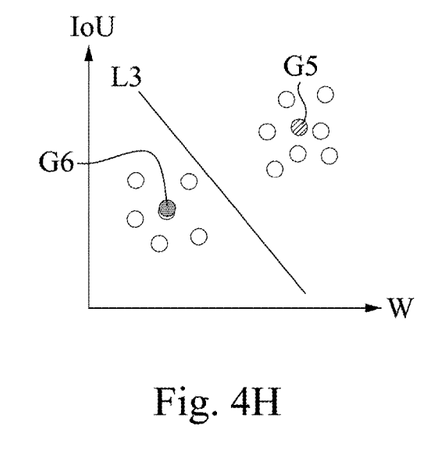

After obtaining the cluster points G3 and G4, the processing unit 110 calculates the distance from each the label point to the two cluster points G3 and G4 again, so that all the label points correspond to one of the cluster points G3 or G4, respectively. As shown in FIG. 4F and FIG. 4G, after recalculating the clustering of each of the label points, a second clustering line L2 will be formed to separate new clusters. Then, as shown in FIG. 4G, calculating the new center of each cluster group to update cluster points G3 and G4 to new cluster points G5 and G6. On the same principle, repeatedly perform the actions "calculating the distance of each label point to cluster points", "updating the cluster groups", and "set the center of the cluster group to the new cluster points". As shown in FIG. 4H, finally, the last cluster points G5 and G6 generated represent the two cluster groups (the two cluster groups are located on both sides of the third clustering line L3). Since those skilled in the art can understand the mathematical principles and formulas of the K-means clustering algorithm, it is not repeated here. In addition, the processing unit 110 may also use K-medians algorithm or Hierarchical algorithm to generate multiple the cluster groups.

As shown in FIG. 4H, in the embodiment, the cluster point G5 corresponds to the cluster group with 7 label points. The cluster point G6 corresponds to the cluster group with 6 label points. Therefore, the cluster group corresponding to cluster point G5 is "the largest cluster group", and the cluster point G5 is the centroid of "the largest cluster group". "Centroid" is a point in the cluster group where the sum of the distances from each of the label points is the smallest. The centroid corresponds to the clustering weight value (e.g., the horizontal coordinate value is 0.8) and the clustering matching value (e.g., the vertical coordinate value is 85%).

The processing unit 110 is configured to determine whether the adjustment condition is met to the calculated centroid (e.g., G5 in FIG. 4H). The adjustment condition may be a weight threshold value or a matching threshold value, or includes both the weight threshold value and the matching threshold value. For example, the weight threshold value is "0.6" and the matching threshold is value "70". Generally speaking, user with more experience in image labeling should have more accurate labeling capabilities, and the corresponding matching degree value should also be higher. Therefore, if the clustering matching value corresponding to the centroid of the largest cluster group that is too low, it means that most of the label results are close to the "user with less experience" (that is, the clustering weight value of the centroid is below the weight threshold value). This situation is not meet expectations, so the neural network unit 130 should be adjusted.

Similarly, if the matching degree value corresponding to the centroid of the largest cluster group is too low (that is, the matching degree value of the centroid is below the matching threshold), it means that most of the matching degree values of the label results is not high, which is also an exception and belongs to the adjustment condition, so the neural network unit 130 should be adjusted.

In some embodiments, when the processing unit 110 determines that the centroid meets the adjustment condition and needs to adjust the neural network unit 130, the processing unit 110 obtains the corresponding recognize identification label data sets according to all label points in the largest cluster group, and sets the corresponding recognize identification label data sets as new learning materials to enable the neural network unit 130 to perform deep learning.

Accordingly, by setting the matching degree values and the weight values corresponding to the recognize identification label data sets to the label points, and calculating the centroid of the largest cluster group, the processing unit 110 will determine whether the forecast result of the neural network unit 130 and the recognition result of the users of the terminal devices 210-230 are approximately consistent. If the processing unit 110 determines that there is a deviation between the forecast result of the neural network unit 130 and the recognition result of the users of the terminal devices 210-230, it means that the adjustment condition occurs, the processing unit 110 selectively uses the recognize identification label data sets as learning materials to adjust the neural network unit 130.

Figure 5:
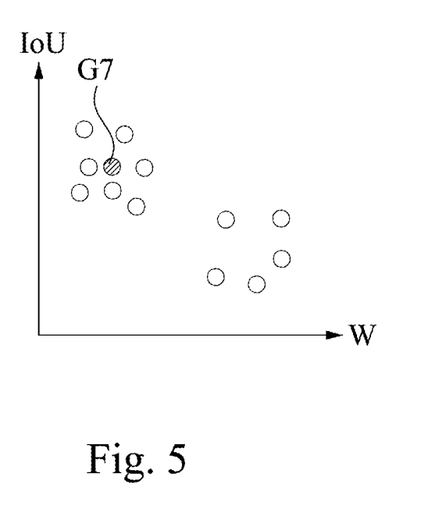
FIG. 5 is a schematic diagram of the cluster groups in some embodiments of the present disclosure.

Referring to the FIG. 5, if after setting the matching degree values and the weight values corresponding to the recognize identification label data sets to the label points, the cluster groups obtained by the processing unit 110 is "lower weight values corresponding to higher the matching degrees", this situation will not meet expectations (as shown in FIG. 5, the weight values corresponding to the centroid G7 are too low). The processing unit 110 confirms this situation to be meet the adjustment condition (i.e., the clustering weight value is below the weight threshold value). In addition, in other embodiments, if after setting the matching degree values and the weight values corresponding to the recognize identification label data to the label points, the cluster groups obtained by the processing unit 110 is "most of the matching degree values of the label points are too low", this situation means that the forecast data sets Dpre provided by the neural network unit 130 are significantly different from the recognize identification label data sets Dt1-Dt3 uploaded by the terminal devices 210-230, so the neural network unit 130 should be adjusted. Therefore, this situation can also be judged as meeting the adjustment condition (i.e., the clustering matching value is less than the matching threshold value).

The calculation of the matching degree values is explained here. In some embodiments, the neural network unit 130 performs an operation on the image data Dim to obtain the forecast data sets (i.e., Dt0 shown in FIG. 3). The processing unit 110 compares the similarity between the recognition identification label data sets Dt1-Dt3 and the forecast data sets, and sets the comparison result as the matching degree values. In other words, the formula for "the matching degree values" is: "the intersection area of the forecast data sets and the recognize label sets" divided by "the union area of the forecast data sets and recognize label sets". Taking FIG. 3 as an example, the calculation formula is the intersection area of Dt0 and Dt1 divided by the union area of Dt0 and Dt1.

In other embodiments, the processing unit 110 compares the similarity between the recognize identification label data sets to each other, and sets the comparison result as the matching degree values. For example, the processing unit 110 receives the recognize identification label data sets Dt1-Dt3 from the terminal devices 210-230. When the processing unit 110 calculates the matching degree values corresponding to the recognize identification label data sets Dt1 of the terminal device 210, the formula is: "the intersection area of the recognize identification label data sets Dt1 and the other recognize identification label data sets" divided by "the union area of the recognize identification label data sets Dt1 and the other recognize identification label data sets". According to this formula, calculating the matching degree values of the identification label data sets Dt1 corresponding to the other identification label data sets Dt2-Dt3, respectively, Finally, average the above results, and take the average result as "the matching identification value of the recognize identification label data sets Dt1 and the image data Dim". For example, when calculating the matching degree values between the identification label data sets Dt1 and the image data Dim, first calculating "the intersection area of Dt1 and Dt2 divided by the union area of Dt1 and Dt2" and "the intersection area of Dt1 and Dt3 divided by the union area of Dt1 and Dt3". Then, calculating the average of the sum of the above two values. The above average result can be regarded as the "the matching degree values of the identification label data sets Dt1 and the image data Dim".

Figure 6:
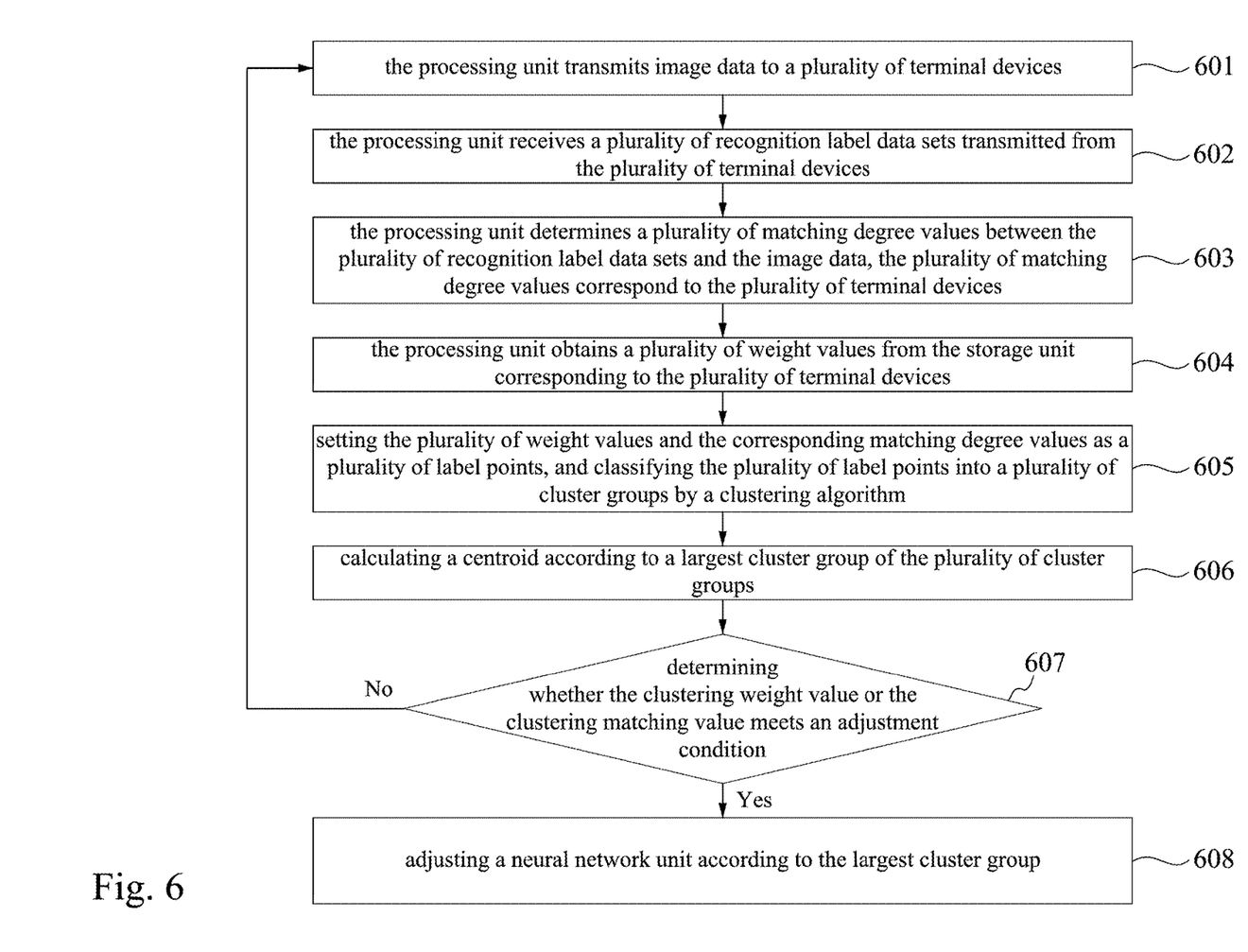
FIG. 6 is a flowchart illustrating a detection method in some embodiments of the present disclosure.

Referring to FIG. 6, FIG. 6 is a flowchart illustrating a detection method in some embodiments of the present disclosure. In step S601, as shown in FIG. 1A, the processing unit 110 transmits the image data Dim to the terminal devices 210-230. The image data Dim includes the forecast data sets Dpre automatically recognized by the neural network unit 130 using the image recognition program 131.

In step S602, as shown in FIG. 1B, the processing unit 110 receives the recognize identification label data sets Dt1-Dt3 from the terminal devices 210-230. The recognize identification label data sets Dt1-Dt3 correspond to the image data Dim (i.e., to a partial area in the image data Dim).

In step S603, the processing unit 110 determines the matching degree values between the recognize identification label data sets Dt1-Dt3 and the image data Dim, and the determined degree values corresponding to the terminal devices 210-230 uploaded the recognize identification label data sets Dt1-Dt3. In some embodiments, the processing unit 110 calculates the matching degree values according to the similarity between each of the recognize identification label data sets Dt1-Dt3 and the forecast data sets Dpre automatically recognized by the neural network unit 130. In other embodiments, the processing unit 110 compares the similarity between the recognize identification label data sets Dt1 to Dt3, and sets the comparison result as the matching degree values.

In step S604, the processing unit 110 obtains multiple weight values W1-W3 corresponding to the terminal devices 210-230 from the storage unit 120. In step S605, the processing unit 110 sets the weight values W1-W3 and the corresponding matching degree values to multiple label points, and divides the label points into multiple cluster groups through the clustering algorithm.

In step S606, the centroid is calculated according to the largest cluster group. The centroid will correspond to a clustering weight value and a clustering matching value. In step S607, the processing unit 110 determines whether the clustering weight value or the clustering matching value meets the adjustment condition (e.g., the clustering weight value is less than the clustering threshold value, or the clustering matching value is less than the matching threshold value). If the clustering weight value or the clustering matching value meets the adjustment condition, in step S608, the processing unit 110 transmits the recognize identification label data sets Dt1-Dt3 corresponding to the largest cluster group to the neural network unit 130, so that the neural network unit 130 performs deep learning and adjusts its internal database.

If the clustering weight value or the clustering matching value does not meet the adjustment condition, it means that the neural network unit 130 need not be adjusted. At this time, the processing unit 110 may transmit the other the image data Dim in the storage unit 120 to the terminal devices 210-230 for another detection process.

Figure 7:
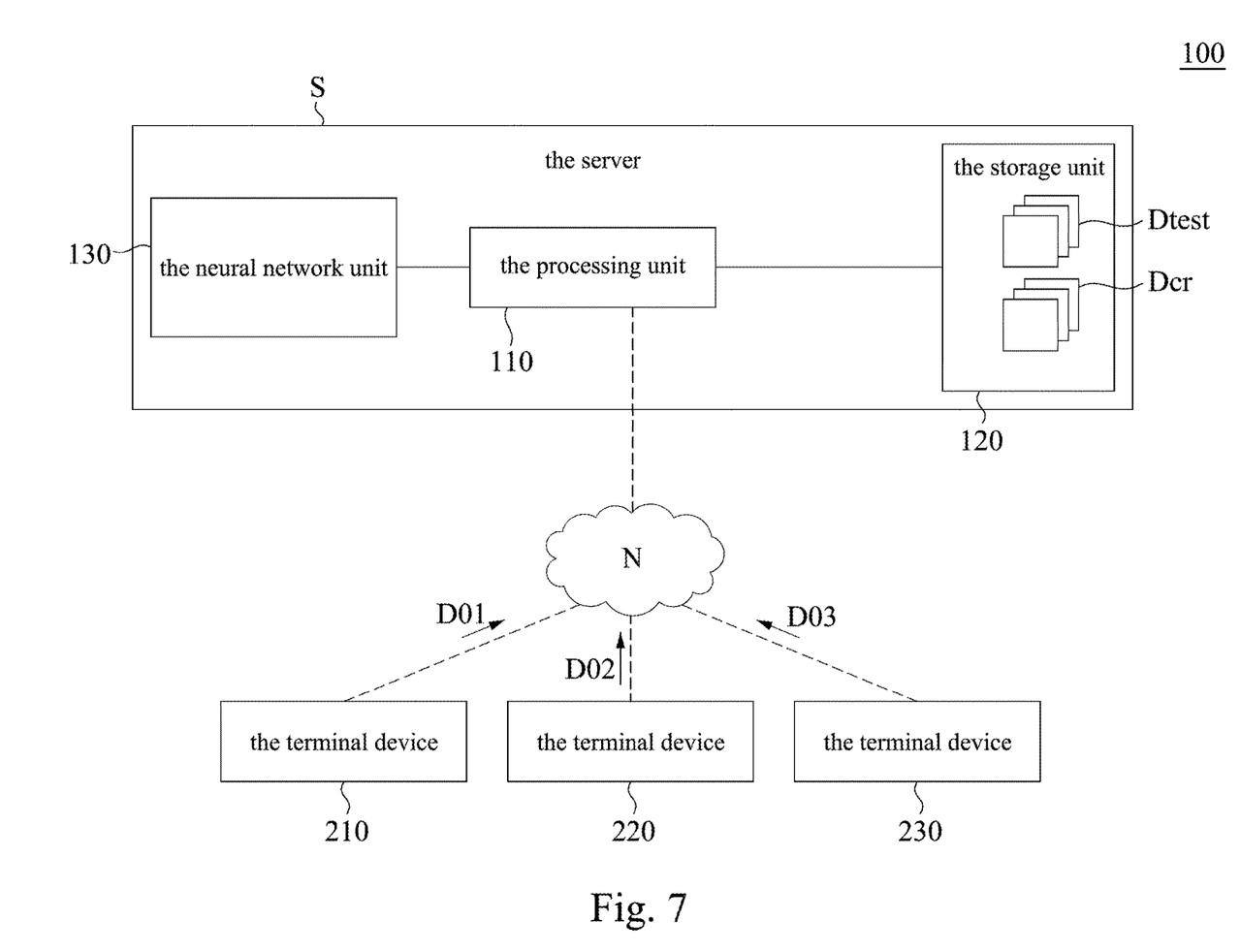
FIG. 7 is a schematic diagram of the Image system setting the weight values in some embodiments of the present disclosure.

Here describes the setting method of the weight values. In general, user with more experience should have more accurate labeling capabilities. Therefore, "the weight values" are directly proportional to the user's experience. Referring to FIG. 7, in some embodiments, the processing unit 110 transmits at least one test image Dtest to the terminal devices 210-230. Users of the terminal devices 210-230 will label the received test image Dtest to generate the test label data sets D01-D03. After receiving the test label data sets D01-D03 returned by the terminal devices 210-230, the processing unit 110 compares the test label data sets D01-D03 with the correct label data sets Dcr stored in the storage unit 120 in advance (e.g., the correct label confirmed in advance by administrator of the server S, each the correct label data set Dcr will correspond to a test image Dtest), to generate the weight values according to the comparison result. There is a proportional relationship between the weight values and the comparison result. For example, if the matching degree value of the test label data set D01 and the correct label data set Dcr uploaded by the terminal device 210 is "90%", the weight values W1 is set to "0.9". If the matching degree value of the test label data set D02 and the correct label data set Dcr uploaded by the terminal device 220 is "60%", the weight values W1 is set to "0.6".

In some embodiments, after the processing unit 110 determines that the neural network unit 130 needs to be adjusted, and provides the recognize identification label data sets to the neural network unit to complete deep learning, the adjusted neural network unit 130 can re-establish (update) the image recognition program 131 in the server S. Accordingly, when users of other remote devices (such as one of the terminal devices 210-230) connect to the server S again, and upload an original image (such as a photo that needs a label), the adjusted neural network unit 130 may use the image recognition program 131 to operate the original image to automatically recognize the objects in the original image, and an image module 121 will be constructed in the storage unit 120.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims.

What is claimed is:

1. A detection method, comprising:
    receiving, by a processing unit of an image system, a plurality of recognition label data sets transmitted from a plurality of terminal devices, wherein the plurality of recognition label data sets correspond to an image data in a storage unit;
    determining a plurality of matching degree values between the plurality of recognition label data sets and the image data, wherein the plurality of matching degree values correspond to the plurality of terminal devices;
    obtaining a plurality of weight values from the storage unit corresponding to the plurality of terminal devices;
    setting the plurality of weight values and the corresponding matching degree values as a plurality of label points, and classifying the plurality of label points into a plurality of cluster groups by a clustering algorithm;
    calculating a centroid of a largest cluster group of the plurality of cluster groups, and the centroid corresponds to a clustering weight value and a clustering matching value; and
    when the clustering weight value or the clustering matching value meets an adjustment condition, adjusting a neural network unit according to the largest cluster group;
    wherein the detection method further comprises:
    determining whether the clustering matching value is less than a matching threshold value; or
    determining whether the clustering weight value is less than a weight threshold value.

2. The detection method of claim 1, wherein determining the plurality of matching degree values between the plurality of recognition label data sets and the image data comprises:
    comparing a similarity between the plurality of recognition label data sets, and setting a comparison result as the plurality of matching degree values.

3. The detection method of claim 1, wherein determining the plurality of matching degree values between the plurality of recognition label data sets and the image data comprises:
    calculating the image data by using the neural network unit to obtain a forecast data set; and
    comparing a similarity between the plurality of recognition label data sets and the forecast data set, and setting a comparison result as the plurality of matching degree values.

4. The detection method of claim 1, further comprising:
    establishing an image recognition program in a server by the adjusted neural network unit.

5. The detection method of claim 1, wherein one of the plurality of recognition label data sets comprises two diagonal coordinate values, the two diagonal coordinate values are configured to correspond to a rectangular area in the image data.

6. The detection method of claim 1, further comprising:
    transmitting a test image to the plurality of terminal devices by the processing unit;
    receiving a plurality of test label data sets from the plurality of terminal devices; and
    comparing the plurality of test label data sets with a correct label data set in the storage unit, and generating the plurality of weight values according to a comparison result.

7. An image system, comprising:
    a neural network unit;
    a storage unit configured to store an image data and a plurality of weight values, wherein the plurality of weight values correspond to a plurality of terminal devices connected to the imaging system; and
    a processing unit connected to the neural network unit and the storage unit, wherein the processing unit is configured to determine a plurality of matching degree values between a plurality of recognition label data sets and the image data according to the plurality of recognition label data sets transmitted from the plurality of terminal devices;
    wherein the processing unit is further configured to set the plurality of weight values and the corresponding matching degree values as a plurality of label points, and is configured to classify the plurality of label points into a plurality of cluster groups by a clustering algorithm;
    wherein the processing unit is further configured to calculate a centroid according to a largest cluster group of the plurality of cluster groups, and when the centroid meets an adjustment condition, the processing unit is configured to adjust the neural network unit according to the largest cluster group;

wherein the processing unit is further configured to determine whether the clustering matching value is less than a matching threshold value, or the processing unit is further configured to determine whether the clustering weight value is less than a weight threshold value.

8. The image system of claim 7, wherein the centroid corresponds to a clustering weight value and a clustering matching value; when the clustering weight value or the clustering matching value meets the adjustment condition, the processing unit is configured to adjust the neural network unit according to the largest cluster group.

9. The image system of claim 8, wherein the processing unit is further configured to compare a similarity between the plurality of recognition label data sets, and is configured to set a comparison result as the plurality of matching degree values.

10. The image system of claim 8, wherein the processing unit is further configured to calculate the image data by using the neural network unit to obtain a forecast data set; the processing unit is further configured to compare a similarity between the plurality of recognition label data sets and the forecast data set to set a comparison result as the plurality of matching degree values.

11. The image system of claim 8, wherein one of the plurality of recognition label data sets comprises two diagonal coordinate values, the two diagonal coordinate values are configured to correspond to a rectangular area in the image data.

12. The image system of claim 8, wherein the processing unit is further configured to transmit a test image to the plurality of terminal devices, and is configured to receive a plurality of test label data sets from the plurality of terminal devices; the processing unit is further configured to compare the plurality of test label data sets with a correct label data set in the storage unit to generate the plurality of weight values according to a comparison result.

* * * * *